(12) United States Patent
Hirooka et al.

(10) Patent No.: US 7,784,829 B2
(45) Date of Patent: Aug. 31, 2010

(54) GAS GENERATOR FOR AIRBAG

(75) Inventors: Masoto Hirooka, Hyogo (JP); Naoki Matsuda, Himeji (JP); Kenji Numoto, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 202 days.

(21) Appl. No.: 12/139,162

(22) Filed: Jun. 13, 2008

(65) Prior Publication Data

US 2008/0284146 A1 Nov. 20, 2008

Related U.S. Application Data

(62) Division of application No. 11/017,861, filed on Dec. 22, 2004, now Pat. No. 7,404,574.

(60) Provisional application No. 60/532,884, filed on Dec. 29, 2003.

(30) Foreign Application Priority Data

Dec. 22, 2003 (JP) ............................. 2003-424023

(51) Int. Cl.
*B60R 21/26* (2006.01)

(52) U.S. Cl. ...................... 280/741; 280/736

(58) Field of Classification Search .................. 280/736, 280/741
See application file for complete search history.

(56) References Cited

U.S. PATENT DOCUMENTS

| | | | |
|---|---|---|---|
| 5,542,702 A | 8/1996 | Green et al. | |
| 5,551,724 A * | 9/1996 | Armstrong et al. | 280/737 |
| 5,582,426 A * | 12/1996 | O'Loughlin et al. | 280/741 |
| 5,590,906 A | 1/1997 | Faigle et al. | |
| 5,975,569 A | 11/1999 | Starozhitsky et al. | |
| 6,095,561 A * | 8/2000 | Siddiqui et al. | 280/742 |
| 6,412,816 B1 * | 7/2002 | Gast et al. | 280/736 |
| 7,073,820 B2 * | 7/2006 | McCormick | 280/741 |
| 7,237,801 B2 * | 7/2007 | Quioc et al. | 280/736 |
| 7,240,916 B2 * | 7/2007 | Bierwirth et al. | 280/736 |
| 7,328,914 B2 * | 2/2008 | Katsuda et al. | 280/736 |
| 7,390,019 B2 * | 6/2008 | Gotoh et al. | 280/741 |

(Continued)

FOREIGN PATENT DOCUMENTS

DE 4005768 A1 8/1991

(Continued)

*Primary Examiner*—Paul N Dickson
*Assistant Examiner*—Drew Brown
(74) *Attorney, Agent, or Firm*—Birch, Stewart, Kolasch & Birch, LLP

(57) ABSTRACT

A gas generator, relating to a gas generator for a side air bag or the like, is provided. The gas generator has an inner cylindrical member is stored in a housing, wherein the inner cylindrical member has a second outside diameter portion abutting against the inner peripheral surface of the housing, and a first outside diameter portion smaller in outside diameter than the second outside diameter portion, the tip end of the first outside diameter portion side abuts against the closed end portion (one end portion) of the housing, the filter is provided on the outside of the inner cylindrical member in the radial direction of the first outside diameter portion, and the ignition means is provided on the opposite end portion (the other end) from the closed end portion of the housing.

7 Claims, 3 Drawing Sheets

U.S. PATENT DOCUMENTS

| | | | |
|---|---|---|---|
| 7,404,574 B2 * | 7/2008 | Hirooka et al. | 280/741 |
| 7,431,335 B2 * | 10/2008 | Khandhadia et al. | 280/737 |
| 7,431,337 B2 * | 10/2008 | Matsuda et al. | 280/741 |
| 7,637,535 B2 * | 12/2009 | Gotoh et al. | 280/741 |
| 7,654,565 B2 * | 2/2010 | McCormick et al. | 280/736 |
| 2005/0110253 A1 * | 5/2005 | Khandhadia et al. | 280/736 |
| 2005/0151357 A1 * | 7/2005 | Yamazaki | 280/741 |
| 2005/0161923 A1 * | 7/2005 | Hirooka et al. | 280/741 |
| 2005/0189754 A1 * | 9/2005 | Matsuda et al. | 280/741 |
| 2007/0024038 A1 * | 2/2007 | Numoto et al. | 280/736 |
| 2007/0063494 A1 * | 3/2007 | Saito et al. | 280/736 |
| 2007/0222195 A1 * | 9/2007 | Yabuta et al. | 280/740 |
| 2009/0121464 A1 * | 5/2009 | Numoto et al. | 280/741 |
| 2009/0267334 A1 * | 10/2009 | Rose et al. | 280/741 |

FOREIGN PATENT DOCUMENTS

| | | |
|---|---|---|
| DE | 19725452 A1 | 12/1998 |
| EP | 1219509 A1 | 7/2002 |
| JP | 11-509154 A | 8/1999 |
| JP | 2001-514991 A | 9/2001 |
| WO | WO-97/02160 A1 | 1/1997 |
| WO | WO-99/08907 A1 | 2/1999 |
| WO | WO-01/74631 A1 | 10/2001 |

* cited by examiner

GAS GENERATOR FOR AIRBAG

This is a Divisional application of a application Ser. No. 11/017,861, filed Dec. 22, 2004, now U.S. Pat. No. 7,404,574 which is a nonprovisional application claims priority under 35 U.S.C. §119(e) on U.S. Provisional Application No. 60/532,884 filed on Dec. 29, 2003 and under 35 U.S.C. §119 (a) on Patent Application No. 2003-424023 filed in Japan on Dec. 22, 2003, the entire contents of which are hereby incorporated by reference.

BACKGROUND OF THE INVENTION

1. Field of the Invention

The invention relates to a gas generator for an airbag, used in an airbag system installed in a vehicle to release a gas for inflating the airbag in the event of a collision, and preferably relates to a gas generator for an airbag, which is used in an airbag system for developing an airbag over the lateral side of a vehicle occupant.

2. Description of the Related Art

As gas generators for air bags installed in automobiles and other vehicles, various types of gas generators such as for a driver side air bag, for a front passenger side air bag, for a side air bag, for a curtain air bag or for a pretensioner has been provided, suitable to installation locations, purposes and so forth.

Among them a gas generator used for a side airbag serves to inflate an airbag that provides protection against an impact from the lateral side of an occupant which improves safety in the event of a lateral collision of the vehicle, for instance, and in most cases, is installed in a seat back, a B-pillar (the center pillar), or the like.

In particular, in the case of a side airbag gas generator or other small gas generator, in order to ensure enough installation space, or to reduce the weight of the gas generator itself, a pyrotechnic gas generator, which uses a solid gas generating agent, have been used as the gas generation source for inflating the bag. In such a gas generator, the gas for inflating the airbag is produced by combustion of the solid gas generating agent serving as the gas generation source. This gas is very hot and combustion by-products are also produced during the combustion, and therefore, a filter is generally used for purifying and cooling the gas produced by combustion. Even in this case, the problem of ensuring enough installation space in the vehicle has to be solved, and the purification and cooling efficiency has to be enhanced. Furthermore, in case of a gas generator for a side airbag, the airbag has to be inflated more quickly because there is less space between the occupant and the structural members inside the vehicle. Accordingly, a filter used for such a gas generator needs to be as little an obstacle as possible in the release of the gas.

In addition, the structure of the gas generator itself needs to be simple in order to avoid difficulty in the manufacture of the gas generator and to eliminate problems that would otherwise be caused by a complicated structure, for example.

A conventional gas generator for a side air bag is disclosed in U.S. Pat. No. 5,542,702, for example.

Also, a gas generator using a filter is disclosed in DE-B No. 4,005,768, for example.

SUMMARY OF THE INVENTION

The gas generator disclosed in the above U.S. Pat. No. 5,542,702 uses pressurized gas as the gas supply source, and therefore does not use a filter. The gas generator disclosed in the above DE-B No. 4,005,768 is formed using a plurality of members, so the structure is complicated, and furthermore, the igniter is disposed in the direction in which the gas is released and therefore interferes with or blocks attachment of the airbag. Also, the space in which the gas generating agent is stored approximates a drum shape, and is too constricted in its middle, so as the ignition flame from the gas generating agent spreads throughout the gas generating agent storing space, this constricted inside diameter portion impedes the smooth propagation of the ignition flame. Thus, the above-mentioned problem is not solved by this gas generator, either. In particular, when gas needs to be generated early in the actuation of the gas generator, or when a large quantity of gas needs to be generated in the initial stage of the actuation of the gas generator, it is undesirable for such a constricted portion to be formed within the space storing the gas generating agent.

Accordingly, it is a purpose of the invention to provide a gas generator for an air bag, particularly used as a gas generator for a side air bag and small gas generators, which can solve effectively a problem in obtaining an installation space, in other words reduction in size, or reducing the weight. In addition, a pyrotechnic gas generator utilizing a solid gas generating agent can have an enhanced efficiency in purifying and cooling a gas and the filter thereof will not obstruct the way of the discharged gas possibly. The gas generator for an airbag is provided with so simple a structure.

In order to achieve the stated object, the present invention provides the following gas generator for an airbag.

Specifically, it provides a gas generator for an airbag, comprising, in a cylindrical housing including at least one gas discharge port in its periphery and having at least one closed end portion, an inner cylindrical member in which the interior is defined to form an accommodating space for a gas generating agent, a filter for purifying the gas generated by the combustion of the gas generating agent, and an ignition means for igniting and burning the gas generating agent accommodated in the accommodating space, wherein the inner cylindrical member comprises a first outside diameter portion and a second outside diameter portion formed to have a larger outside diameter than that of the first outside diameter portion and also to be in contact with the inner peripheral surface of the housing, with the tip end, in the first outside diameter portion side, in contact with the closed end portion (one end portion) of the housing, the filter is provided radially on the outside of the first outside diameter portion in the inner cylinder, and the ignition means is provided on the opposite end portion (the other end portion) from the closed end portion of the housing.

In the above gas generator of the present invention, the filter is provided radially on the outside of only the first outside diameter portion in the inner cylinder disposed inside the housing. Therefore, in comparison with the case in which a filter is disposed along the entire axial length of the housing, the filter of the present invention, even in the same weight as the above filter, can be made thicker by an amount equal to the reduction in axial length. As a result, the gas travels a greater distance, which improves the cooling efficiency of the filter. Thus, the filter used in the gas generator of the present invention does not impede the passage of the gas, while providing a good cooling effect.

Also, since the ignition means is provided on the opposite end portion (the other end portion) from the closed end portion of the housing and is not located in the opening direction (that is, in the direction in which the gas is released) of the gas discharge port in the housing, the ignition means does not disturb the attachment of the airbag. The result of this configuration is that, when a gas flows through the combustion chamber (that is, the gas generating agent accommodating space) from the side where the ignition means is installed (in the other end portion side) toward the closed end portion (one end portion) side of the housing, ordinarily, the filter would be damaged by the compression force acting in the axial direction. In the airbag gas generator of the present invention, however, the filter is provided on the outside of the inner cylindrical member, and the tip end in the first outside diameter portion side of this inner cylindrical member abuts against the closed end portion side of the housing. The tip end in the first outside diameter portion side means the tip end of the portion (regardless of outside diameter), which exists in a much closer portion to the closed end portion (one end portion) of the housing than the portion where the first outside diameter portion is formed. Accordingly, the inner cylindrical member bears the action (compression force) during gas flow, so that the filter sustains no damage. Furthermore, since the second outside diameter portion formed in the inner cylindrical member abuts against the inner peripheral surface of the housing, the gas is prevented from making a short pass between the filter and the housing, and also the inner cylindrical member can be positioned properly.

The housing functions as the outer container of the gas generator, and more particularly is in the form of a cylinder that is closed at one end, and at least one gas discharge port is formed in the periphery thereof. One end portion of the housing is preferably closed by a closing portion formed integrally with the peripheral wall of the housing, but may also be closed with a closing member formed separately from the peripheral wall. The other open end portion of the housing can be closed with an igniter collar for supporting or fixing the ignition means as described later, or another member. For instance, it can be closed with a metal plate.

The housing accommodates at least an inner cylindrical member in which the interior is defined to form a space for storing a gas generating agent, a filter for purifying the gas generated by the combustion of the gas generating agent, and ignition means for igniting and combusting the gas generating agent stored in the accommodating space.

The inner cylindrical member is substantially cylindrical, and has at least two outside diameters (first outside diameter portion and second outside diameter portion) along its length. The portions formed to have different outside diameters (the first outside diameter portion and second outside diameter portion) can be adjacent to each other in the axial direction, or yet another portion having different outside diameter (third outside diameter portion) can be interposed between these first two outside diameter portions, so as to be adjacent to each in the axial direction. In other words, the inner cylindrical member includes at least two portions formed to have different outside diameters, a portion having one of these outside diameters (i.e. the second outside diameter portion) is formed in such a size (outside diameter) to abut against the inner surface of the housing, while the other portions having one or more outside diameters (the first outside diameter portion) are formed to have a smaller outside diameter than that of the second outside diameter portion. And the inner cylindrical member is disposed, with the tip end abutting against the closed end portion of the housing, to direct the first outside diameter portion at the closed end portion of the housing. A space for accommodating a gas generating agent is formed on the inside of this inner cylindrical member, and at least one opening is formed in the peripheral surface for releasing to the outside of the inner cylindrical member the gas produced by the combustion of the gas generating agent inside the gas generating agent accommodating space. The gas released from the opening needs to be subsequently purified with a filter, so it is preferable for the opening to be formed in a portion covered by the filter, such as all or part of the first outside diameter portion.

The filter has the function of purifying the gas produced by the combustion of the gas generating agent stored in the interior space of the inner cylindrical member, and the function of cooling this gas, and is provided on the outside of the inner cylindrical member in the radial direction, and preferably on the outside of the first outside diameter portion in the radial direction. In particular, when the filter is provided on the outside of the first outside diameter portion in the radial direction, the portion covered by the filter can be defined as the first outside diameter portion. When the first outside diameter portion of the inner cylindrical member is covered by the filter, the first outside diameter portion is formed to obtain enough space to accommodate the filter between the first outside diameter portion and the inner peripheral surface of the housing, and preferably is formed to obtain a space capable of functioning as a gas flow space between the outer peripheral surface of the filter provided on the first outside diameter portion, and the inner peripheral surface of the housing.

The function of the ignition means is to start the operation of the gas generator. The constitution of the ignition means can include an igniter that produces a flame or heat mist for starting the operation of the gas generator upon receipt of an electrical actuation signal, or the constitution can include an igniter that amplifies the flame or heat mist produced by the igniter. This igniter is installed on the opposite end portion (the other end portion) from the closed end portion (one end portion) of the housing.

The following aspects are preferred in the gas generator for an air bag according to the present invention.

The gas generating agent accommodating space comprises two combustion chambers which are adjacent to each other in the axial direction to be capable of communicating with each other, the first combustion chamber is provided to the closed end portion (one end portion) of the housing, and the second combustion chamber is provided to the opposite end portion (the other end portion) from the closed end portion of the housing, and the ignition means is provided inside the second combustion chamber, and the gas generating agents charged in the first combustion chamber and second combustion chamber differ from each other between the combustion chambers in at least one of a charged amount, composition, composition ratio, size, and shape. With this gas generator, the two combustion chambers axially adjacent to each other are formed to be capable of communicating with each other, and they can be arranged to communicate with each other from the outset (that is, always in communication), or alternatively they can be formed to communicate with each other when a blocking member (such as a rupture plate) disappears, deforms, moves, and/or burns in the operation of the gas generator. A partition member fixed by press-fitting inside the inner cylinder is an example of a partition between the first combustion chamber and second combustion chamber. This partition member can, for example, be provided with a communication hole that allows the first combustion chamber and second combustion chamber to communicate at all times, or be formed such that this communication hole is formed during the combustion of the second gas generating agent. The combustion performance of the second gas generating agent can be adjusted by adjusting the opening area of the communication hole.

Thus using different gas generating agents for the respective combustion chambers allows an amount of gas generated by the combustion of the gas generating agent to be varied in the operation of the gas generator, and as a result, it is possible to adjust the airbag inflation pattern as desired, such as inflating the airbag quickly at the initial stage and then increasingly slowly, or inflating the airbag in the opposite pattern.

In the present invention, the gas generating agent disposed in the first combustion chamber has the combustion temperature (the temperature generated during the combustion of the gas generating agent; the same applies hereinafter) of 1000 to 1700° C., and preferably 1000 to 1600° C., and even more preferably 1000 to 1500° C., while the gas generating agent disposed in the second combustion chamber has the combustion temperature of 1700 to 3000° C., and preferably 1700 to 2800° C., and even more preferably 1700 to 2500° C. This combustion temperature of the gas generating agent can be obtained by theoretical calculation. For instance, it can be computed from a NEW PEP (New Propellant Evaluation Program) produced on the basis of the basic program of the US Naval Weapons Center. When the combustion temperature of the gas generating agent is low, an amount of filter required for cooling purposes (that is, a filter that also functions as a coolant) will be smaller, and this is extremely favorable in terms of making the gas generator smaller and lighter. However, ignitability generally tends to decrease when the combustion temperature of a gas generating agent is low. Nevertheless, the problem with the ignitability of a gas generating agent can be solved as follows with the gas generator of the present invention. If the gas generating agent stored in the first combustion chamber (hereinafter referred to as the first gas generating agent) has a low combustion temperature (that is, has low ignitability), a gas generating agent having a higher combustion temperature (that is, better ignitability) than the first gas generating agent can be used as the gas generating agent disposed in the second combustion chamber (hereinafter referred to as the second gas generating agent), which promotes the ignition and combustion of the first gas generating agent.

An example of a combination of gas generating agents having such combustion temperatures is for the first gas generating agent to be a gas generating agent comprising guanidine nitrate and basic copper nitrate, and the second gas generating agent to be a gas generating agent comprising nitroguanidine and strontium nitrate. Specifically, the gas generating agent comprising guanidine nitrate and basic copper nitrate (the first gas generating agent) has a low combustion temperature and low ignitability, and when an attempt is made to ignite this agent using boron niter, which is commonly used as an igniter, the combustion finishes in an instant because of the boron niter in the form of a powder. Even if an amount of boron niter is increased, it is insufficient for burning the gas generating agent and sustaining the combustion. In view of this, it is preferable to use a gas generating agent comprising the above-mentioned nitroguanidine and strontium nitrate, for example, or a gas generating agent that can sustain combustion for a certain amount of time, as the second gas generating agent in order to ignite and combust the first gas generating agent with lower combustion temperature and ignitability. Since this causes the combustion of the second gas generating agent itself to be sustained for a certain amount of time, the first gas generating agent is exposed to the combustion flame of the second gas generating agent for a relatively long time, and as a result, combustion can be achieved even with the first gas generating agent with lower ignitability. In terms of this action and effect the second gas generating agent can also be defined as one that is not directly ignited and burnt by a conventional igniter or transfer charge (or, even if it is ignited and burnt by them, one that can not obtain a sufficient combustion performance to give a gas generator including this agent an adequate occupant restraint performance), and a second gas generating agent defined such as this is not strictly confined to the range of combustion temperatures given above.

An amount of filter used (a filter functioning as a coolant) can be reduced by lowering the overall combustion temperature of the gas generating agent, and in this respect it is preferable for a charged amount of the first gas generating agent to be greater than a charged amount of the second gas generating agent. In view of this, in the gas generator of the present invention, charged amounts of the first gas generating agent and second gas generating agent can be set optionally to any ratio with a press-fitted partitioning plate. This provides an airbag gas generator in which the combustion temperature of the gas generating agent can be adjusted precisely as desired, and the operational output of the gas generator can be finely controlled.

Also, in the airbag gas generator of the present invention, the housing can be formed cylindrical and longer in the axial direction, and at least one opening, that allows communication between the gas generating agent accommodating space and the external environment of the inner cylindrical member, can be formed in the inner cylindrical member, the opening existing locally, only on part of the circumferential surface of the first outside diameter portion near the closed end portion of the housing. At least one opening formed in the inner cylindrical member functions as a gas outlet for releasing the gas produced inside the gas generating agent accommodating space to the outside of the inner cylindrical member (that is, to the external environment). The opening can be formed to allow communication from the outset (that is, open all the time), or it can be formed to allow communication (open) when a blocking member (such as a rupture plate) disappears in the operation of the gas generator. In a gas generator formed in this way, the ignition means is formed at one end and the opening at the other end of the gas generator that is formed longer in its axial direction. That is, when combustion of the gas generating agent begins from the side where the ignition means is installed, in the gas generating agent accommodating space (that is, the combustion chamber) formed on the inside of the inner cylindrical member, the flame or high-temperature gas flows toward the above-mentioned opening provided on the opposite side from the side where the ignition means is disposed. Therefore, even with a long housing, combustion that occurs at one end thereof (the end where the igniter is installed) proceeds to the opposite end, thereby affording effective ignition and combustion of all of the gas generating agent in the inner cylindrical member. Particularly, the combustibility of the first gas generating agent can be pronounced.

Also, in the airbag gas generator of the present invention, a third outside diameter portion that has a larger outside diameter than that of the first outside diameter portion and smaller than the second outside diameter portion can be further provided between the first outside diameter portion and the second outside diameter portion in the inner cylindrical member. Thus providing a third outside diameter portion ensures a constant gas generating agent accommodating space, ensures a first outside diameter portion for disposing the filter, and allows the range (or peripheral surface area) of the second outside diameter portion to be smaller, which results in a smaller contact area between the housing and the inner cylindrical member, and effectively prevents the transfer of heat from the inner cylindrical member to the housing, as well as the transfer of the heat of the filter to the housing via the inner cylindrical member. In other words, by providing the inner cylindrical member with a third outside diameter portion that does not touch the inner peripheral surface of the housing, the heat generated in the combustion chamber can hardly transfer to the peripheral walls of the housing.

Also, in the airbag gas generator of the present invention, the ignition means comprising an igniter to be actuated by an ignition current is used, this igniter is attached to a collar member that closes the opposite end portion to the closed end portion of the housing, and the second outside diameter portion-side end of the inner cylindrical member comes into contact with this collar member. This makes it easier to fix and position and the igniter, and the inner cylindrical member can also be fixed by fixing collar member. When fixed in this way, the inner cylindrical member is held tightly between the collar member and the closed end portion of the housing, which prevents the inner cylindrical member from moving. Also, since the filter is fixed to the inner cylindrical member that is held tightly and fixed, the entire structure housed in the housing can be fixed. In particular, in the fixing of the igniter collar, it is preferable to fix the igniter collar by crimping the open end portion of the housing (the opposite side to the closed end). This makes it easier to fix the collar, and furthermore the positioning of the collar is accomplished in the course of crimping the housing end portion.

In regard to the fixing of the collar member and the inner cylindrical member in particular, in the airbag gas generator of the present invention, a protrusion can be formed on the inner peripheral surface of the housing, and the collar member and the second outside diameter portion-side end of the inner cylindrical member can abut against this protrusion. In this case, the igniter collar provided with the igniter can be disposed after the inner cylindrical member first is fixed with this protrusion. This keeps the parts from falling out and so forth during conveyance along the gas generator manufacturing line, and therefore affords safe manufacture. Furthermore, the force of crimping the open end portion of the housing in the course of fixing the igniter collar can be prevented from acting directly on the inner cylindrical member.

Also, in the airbag gas generator of the present invention, a gas discharge port provided on the housing can be formed closer to the side where the ignition means is disposed, rather than to the axial center of the housing. If this is done, when two gas generators are linked and used together, that is, when creating gas generators in which the number of gas generators to be activated and the timing of activation can be adjusted according to the impact, by connecting end portions where the ignition means is not present, the ignition means of the linked gas generators are located away from the connected end portions. This facilitates the take-off of lead wires that are connected to the ignition means for the transmission of an activation signal, and does not interfere with the airbag. Also, the gas discharge ports in the connected gas generators are formed on the ignition means side of each gas generator, that is, on the side away from the connected portions. Because of this, when different air bags are connected to the respective gas generators to be used, the air bags can be connected more easily to gas discharge ports respectively. A configuration in which two gas generators are thus connected and a different airbag is connected to each gas generator is advantageous, for example, when one airbag designed to restrain the chest of an occupant, and a different airbag is designed to restrain the waist of the occupant. This gas generator can be used not only in a side airbag system, but also an air bag system for a driver side, an air bag system for passenger side, an air bag system for a curtain airbag and the like.

The present invention effectively solves the problems related to ensuring installation space and reducing weight in a gas generator for a side airbag and other such a small gas generator. In particular, when a filter is used in a pyrotechnic gas generator which uses a solid gas generating agent, such an airbag gas generator is provided that the purification and cooling efficiency of this filter in a smaller amount is enhanced, a filter is as little an obstacle as possible at the time of releasing a gas and a structure is simple.

Furthermore, in a gas generator in which a first combustion chamber and second combustion chamber are charged with different gas generating agents, even though a compound with low ignitability is used as the first gas generating agent, it can still be burnt effectively, and in a gas generator in which a third outside diameter portion is further formed in the inner cylindrical member, the transfer of the heat produced by the combustion of the gas generating agent to the housing can be kept to a minimum. Also, using an igniter collar not only facilitates the assembly of the gas generator, but also allows the constituent elements of the gas generator housed in the housing to be fixed easily and securely.

DETAILED DESCRIPTION OF THE INVENTION

Figure 1:
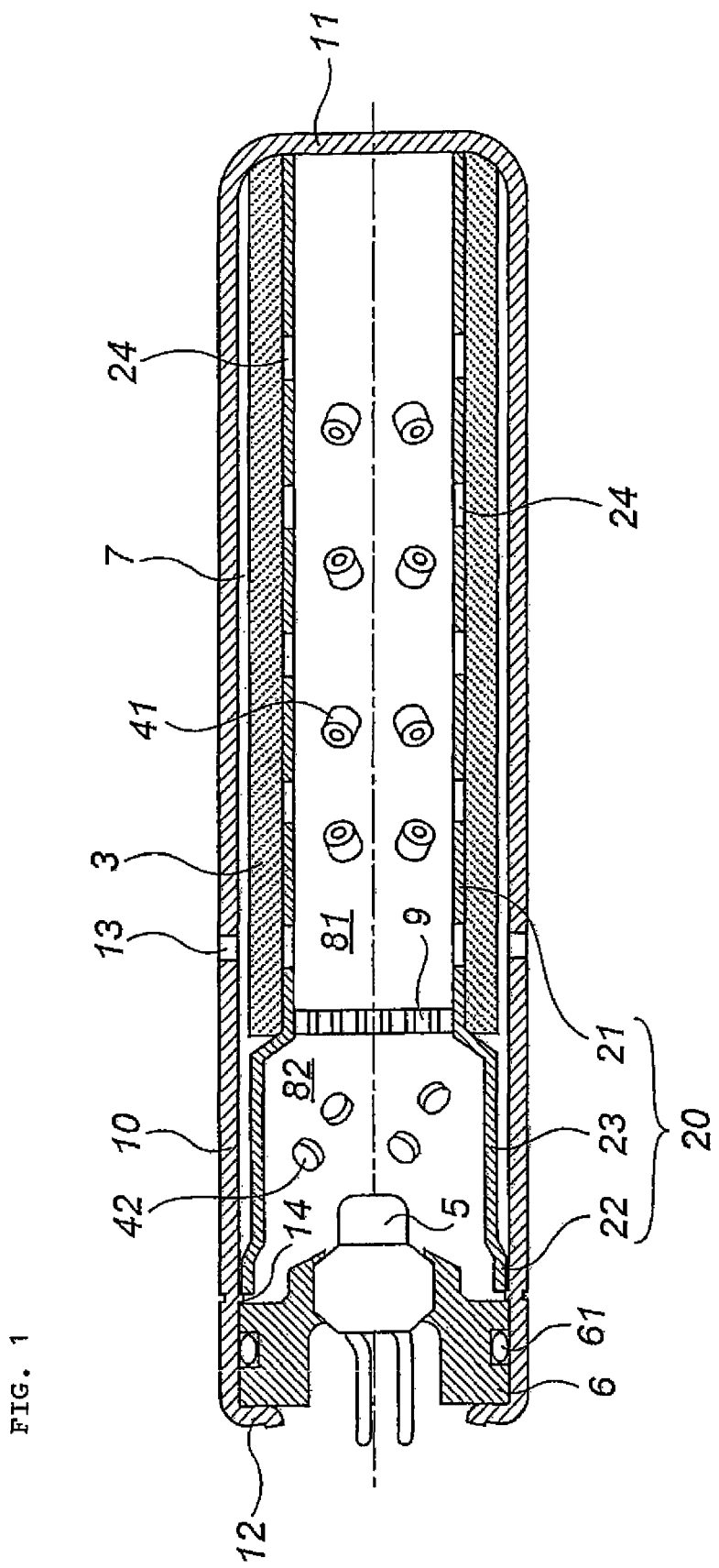
FIG. 1 is an axial cross section of an airbag gas generator.
Figure 2:
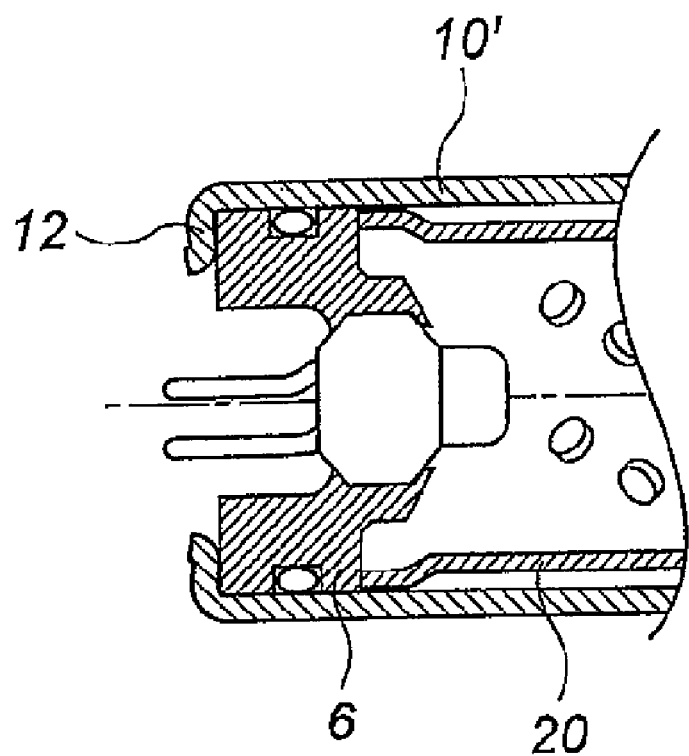
FIG. 2 is a cross section of the main components in another embodiment of an airbag gas generator.
Figure 3:
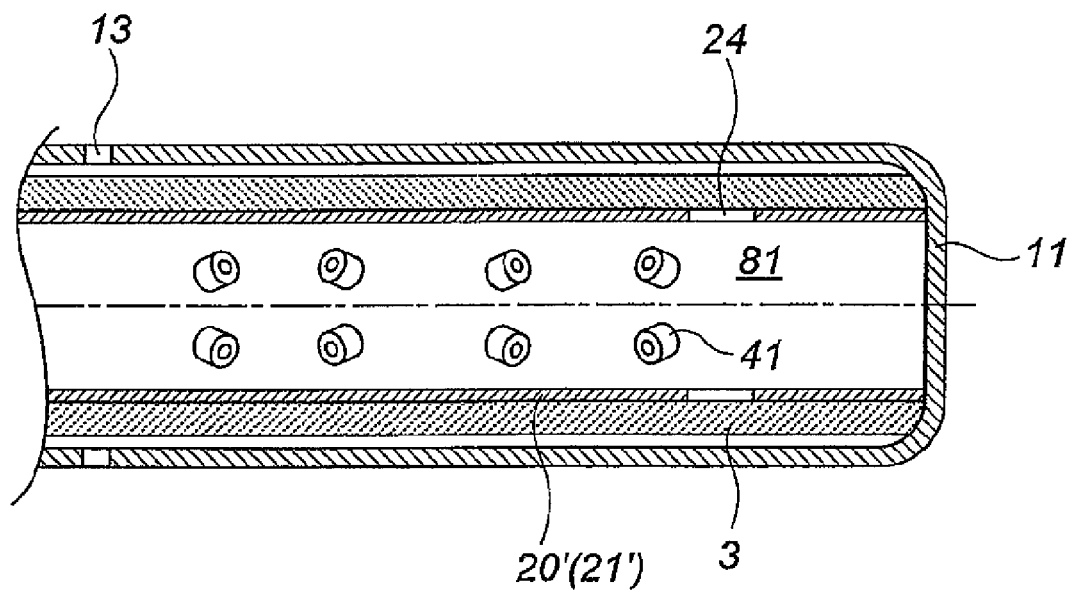
FIG. 3 is a cross section of the main components in yet another embodiment of an airbag gas generator.

Embodiments of the present invention will now be described with reference to the drawings. FIG. 1 is an axial cross section of an embodiment of the gas generator for an airbag according to the present invention. FIGS. 2 and 3 are cross sections of the main components in other embodiments.

With the gas generator shown in FIG. 1, an inner cylindrical member 20 is disposed in a housing 10 that is closed at one end and open at the other end, a filter 3 is disposed on the outside of the inner cylindrical member 20, and the inside of the inner cylindrical member 20 is charged with gas generating agents 41 and 42. An igniter collar 6 having an igniter 5, i.e. an ignition means, fixed thereto is provided to the open end portion 12 of the housing 10, and the open end portion 12 of the housing 10 is crimped to fix this igniter collar 6.

In the embodiment shown in FIG. 1, the inner cylindrical member 20 comprises the first outside diameter portion 21, the third outside diameter portion 23, and the second outside diameter portion 22, formed in that order starting from the closed end portion 11 of the housing 10 toward the open end portion 12 in which the igniter 5 is accommodated. The outside diameter of the respective outside diameter portions is formed to increase in that order. The second outside diameter portion 22, which is formed in the largest outside diameter, is formed in a size such that its outer peripheral surface fits the inner peripheral surface of the housing 10. In particular, with this embodiment, the axial length of each outside diameter portion is in inverse proportion to the outside diameter of each outside diameter portion. Specifically, the second outside diameter portion 22, the third outside diameter portion 23 and the first outside diameter portion 21 are formed in that order of increasing length in the axial direction. The third outside diameter portion 23 of the inner cylindrical member 20 has a smaller outside diameter than that of the second outside diameter portion 22, in other words, it is formed in such a size that is never in contact with the inner surface of the housing 10. The third outside diameter portion 23 is thus formed to obtain a gap with the housing peripheral wall surface and also the contact surface area between the second outside diameter portion and the housing peripheral wall surface is small, and therefore, the transfer of heat from the inner cylindrical member 20 to the housing 10 is kept to an absolute minimum. Also, the filter 3, which is formed by winding up a metal wire rod into multiple layers, is provided on the radial outside of the first outside diameter portion 21, and the outside diameter of this first outside diameter portion 21 is set in view of the thickness of the filter 3 to be formed, and the width of the gap 7 to be obtained on the outside of the filter 3. And, the axial length of the first outside diameter portion 21 matches the axial length of the filter 3 to be formed. Plural openings 24 that allow communication between the external environment of the inner cylindrical member 20 and an accommodating space (combustion chambers) of the gas generating agent (41 and 42), and the flame produced by the combustion of the gas generating agent (41 and 42) stored inside the inner cylindrical member 20 is released from these openings 24 toward the filter 3.

Since the axial length of the filter 3 is reduced in the present invention and the filter is made thicker by a corresponding amount, an effect of cooling and purifying the gas can be enhanced, and also an adequate gas passage surface area is ensured. The filter 3 is not limited to the embodiment shown in FIG. 1, and it can be formed even thicker and shorter in the axial direction. The filter 3 can also be formed to cover just part of the first outside diameter portion 21, rather than the entire portion. However, the openings 24 formed in the peripheral surface of the first outside diameter portion 21 have to exist in the range that is covered with the filter 3.

Also, since the third outside diameter portion 23 is formed to have a larger outside diameter than that of the first outside diameter portion 21, adequate space can be ensured in the interior thereof, which makes it possible for more gas generating agent to be stored therein.

A combustion chamber (i.e. gas generating agent accommodating space) is provided on the inside of the inner cylindrical member 20. Particularly in this embodiment, two combustion chambers that are adjacent to each other in the axial direction to communicate with each other are provided in the inner cylindrical member 20. A first combustion chamber 81 is provided to the closed end portion 11 of the housing 10, and a second combustion chamber 82 is provided to the open end portion 12 of the housing 10. The first combustion chamber 81 and the second combustion chamber 82 are partitioned by a partitioning wall 9 provided to separate the two chambers, and plural through holes are formed in this partitioning wall 9, so that the two combustion chambers are kept in communication with each other. The first combustion chamber 81 is charged with the first gas generating agent 41, and the second combustion chamber 82 is charged with the second gas generating agent 42. When two combustion chambers are sectioned, the first combustion chamber 81 and second combustion chamber 82 can be charged with a different gas generating agent. For instance, the first combustion chamber 81 can be charged with a gas generating agent with low ignitability and a low combustion temperature (such as a gas generating agent including guanidine nitrate and basic copper nitrate), while the second combustion chamber 82 can be charged with a gas generating agent that has good ignitability and can sustain combustion, so as to compensate for the low ignitability of the first gas generating agent 41. Particularly, the combustion temperature of the first gas generating agent is preferably in the range of 1000 and 1700° C. Such a gas generating agent can be obtained, for example, by forming a composition comprising 41% by mass of guanidine nitrate, 49% by mass of basic copper nitrate, a binder and additives, and molding this composition into a single-perforated cylinder with the outside diameter of 1.8 mm, the thickness of 1.9 mm and the inside diameter of 0.7 mm. The combustion temperature of the second gas generating agent is preferably in the range of 1700 and 3000° C. Such a gas generating agent can be obtained, for example, by forming a composition including of 34% by mass of nitroguanidine and 56% by mass of strontium nitrate, and molding this composition into a pellet with the outside diameter of 1.5 mm, and the thickness of 1.5 mm. The combustion temperature of the gas generating agents can be suitably adjusted by varying the composition, the compositional ratio, the shape, size and so forth.

In this embodiment, the first combustion chamber 81 is provided on the inside of the first outside diameter portion 21, and the second combustion chamber 82 is provided on the inside of the third outside diameter portion 23 and the second outside diameter portion 22, and the volume of each combustion chamber can be adjusted by adjusting the position of the partitioning wall 9.

Also, with this embodiment, a protrusion 14 is formed on the inner surface of the housing 10, and this protrusion supports the end portion of the inner cylindrical member 20 in the second outside diameter portion 22 side, and fixes the inner cylindrical member 20. Specifically, the end portion of the inner cylindrical member 20 in the first outside diameter portion 21 side (this does not necessarily have to be the end portion of the first outside diameter portion, and if there is a portion formed with an even smaller or larger inside diameter, this may be the end portion thereof) is in contact with the closed end portion 11 of the housing 10, and the end portion on the other side (the end on the second outside diameter portion 22 side) is in contact with the protrusion 14 on the inner surface of the housing 10, so the inner cylindrical member 20 is sandwiched and fixed at these two ends. The protrusion 14 on the inner surface of the housing 10 can be formed by crimping the corresponding location of the housing 10.

The igniter 5, which is fixed to the igniter collar 6, is installed as the ignition means at the open end portion 12 of the housing 10. This igniter collar 6 is fixed by crimping the open end portion 12 of the housing 10 and being held between the crimped end and the protrusion 14 on the inner surface of the housing 10. The igniter collar 6 is also provided with a sealing member 61 such as an O-ring in order to prevent gas from passing between the peripheral surface of the collar and the inner surface of the housing 10.

With a gas generator formed in this manner, when a flame is produced by an actuation of the igniter 5 by an actuation signal (current), the second gas generating agent 42 is ignited by this flame, and the combustion flame of the second gas generating agent 42 ignites and burns the first gas generating agent 41. The gas produced by the combustion of the two gas generating agents is released from the openings 24 of the inner cylindrical member 20 toward the filter 3, is purified and cooled while it passes through the filter 3, and passes through the gap 7 to be ejected from a gas discharge port 13.

In the embodiment shown in FIG. 1, the gas discharge port 13 is formed away from the closed end portion 11, that is, closer to the open end portion 12 (the side where the ignition means is provided), and therefore, when two gas generators are connected by connecting the respective closed end portions 11 of the housings 10 with each other, the ignition means and the gas discharge port 13 in one of the two connected gas generators is further apart from the other. This makes it easier for the gas discharge port 13 of each gas generator to be connected to a different airbag, and additionally it makes it easier to connect lead wires (cords for transmitting actuation signals) to the respective igniters 5.

FIG. 2 illustrates an aspect in which the end portion of the inner cylindrical member 20 in the second outside diameter portion 22 side is in contact with the igniter collar 6. Specifically, in the aspect shown in FIG. 1, the protrusion 14 is provided inside the housing 10 to support the inner cylindrical member 20, but the housing 10 shown in this embodiment is not provided with such a protrusion, and the inner cylindrical member 20 can be also fixed by the end face of the igniter collar 6 at the time of fixing the igniter collar.

FIG. 3 illustrates an aspect in which the openings 24 formed in an inner cylindrical member 20', particularly in a first outside diameter portion 21', are provided locally in the periphery of the first outside diameter portion 21' only in the closed end portion side of the housing 10. With this configuration, the gas or flame of the second combustion chamber 82 and the first combustion chamber 81 flows toward the openings 24, which improves the ignitability of the gas generating agent in the first combustion chamber 81. Since the gas discharge port 13 is formed away from these openings 24, the gas exhausted from the openings 24 passes through the filter 3 at an angle, which further promotes the purification and cooling of the gas. In addition, when the openings 24 are formed in the first outside diameter portion 21 of the inner cylindrical member 20', they can be formed in a plurality of rows, such that the opening surface area is increased gradually toward the closed end portion 11.

The filter shown in FIG. 1 is formed by winding a single wire rod into multiple layers. Such a filter can be obtained, for example, by winding a single wire rod into multiple layers around a core, after which the core is removed, and disposing the wound rod on the first outside diameter portion 21 of the inner cylindrical member 20, or alternatively by winding the wire rod directly onto the first outside diameter portion of the inner cylindrical member 20 and disposing together with the inner cylindrical member 20 in the housing. Particularly in the latter case (when an inner cylindrical member wound with wire rod is disposed), the unraveling of the wire rod that can occur when the core is removed is prevented. If the winding end of the wire is fixed by spot welding or the like, there will be no unraveling.

In addition to a filter formed by winding a wire rod as described above, the filter shown in FIG. 1 can also be a filter obtained by winding a knitted wire into multiple layers and compression-molding the same in a mold, or alternatively, a plain woven wire mesh, plain-dutch wire mesh, punched metal, expanded metal, or the like is wound into multiple layers to be used as such a filter.

The invention claimed is:

1. A gas generator for an air bag, comprising:
   a cylindrical housing including a first end and a second end opposite to the first end, and provided with a gas discharging port;
   an inner cylindrical member having a first outside diameter portion at one end thereof and a second outside diameter portion, larger than the first outside diameter portion, at another end opposite to the one end, the inner cylindrical member being provided inside the cylindrical housing, such that the second outside diameter portion is in contact with an inner circumferential surface of the cylindrical housing and defining a cylindrical space between the inner circumferential surface of the cylindrical housing and the first outside diameter portion, the first outside diameter portion defining a first accommodating space therein and also having an opening provided locally in a periphery thereof only in a vicinity of the one end for allowing communication between the first accommodating space and the cylindrical space, and the second outside diameter portion defining a second accommodating space therein;
   a first gas generating agent provided inside the first accommodating space; and
   ignition means provided in the second accommodating space.

2. A gas generator for an air bag, according to claim 1, further comprising:
   a partitioning wall provided inside the inner cylindrical member between the first accommodating space and the second accommodating space, the partitioning wall having a through hole that allows communication between the first accommodating space and the second accommodating space.

3. A gas generator for an air bag, according to claim 2, further comprising:
   a second gas generating agent provided inside the second accommodating space.

4. A gas generating agent according to claim 1, wherein said another end of the inner cylindrical member is in contact with the ignition means.

5. A gas generating agent according to claim 1, wherein the first outside diameter portion has a constant outside diameter along an axial direction of the cylindrical housing.

6. A gas generating agent according to claim 1, further comprising:
   a filter provided in the cylindrical space and defining a gap between an outer peripheral surface of the filter and the inner circumferential surface of the cylindrical housing.

7. A gas generating agent according to claim 1, wherein the ignition means includes an igniter and an igniter collar that supports the igniter, and said another end of the inner cylindrical member is in contact with the igniter collar.

* * * * *